(No Model.)
E. L. WILLIAMS.
BICYCLE LAMP.
No. 560,879.  Patented May 26, 1896.
2 Sheets—Sheet 1.
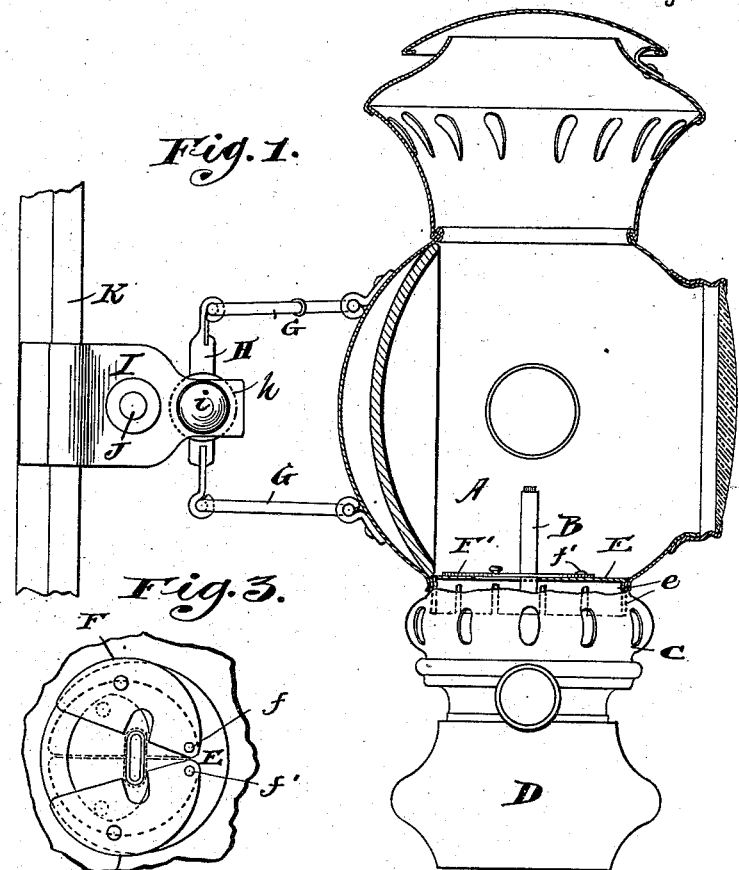
Fig. 1.
Fig. 3.
Fig. 2.
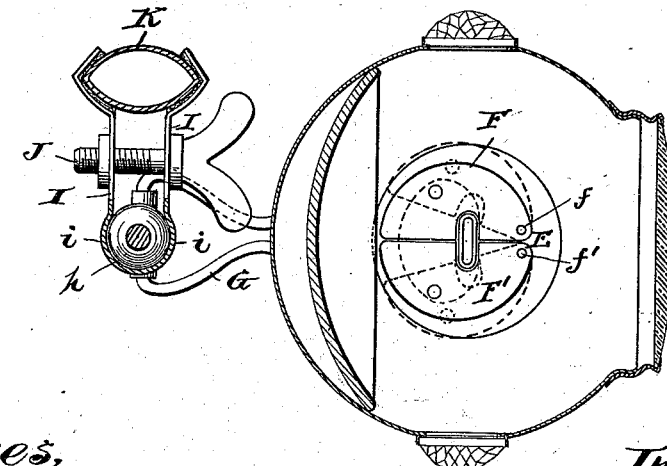
Witnesses,
Inventor,
Edward L. Williams
By Offield, Towle & Linthicum
Attys.

(No Model.) 2 Sheets—Sheet 2.

E. L. WILLIAMS.
BICYCLE LAMP.

No. 560,879. Patented May 26, 1896.

Witnesses,
F. S. Mann
N. M. Bond

Inventor,
Edward L. Williams
By Offield, Towle & Linthicum
Attys.

UNITED STATES PATENT OFFICE.

EDWARD L. WILLIAMS, OF CHICAGO, ILLINOIS.

BICYCLE-LAMP.

SPECIFICATION forming part of Letters Patent No. 560,879, dated May 26, 1896.

Application filed October 31, 1895. Serial No. 567,467. (No model.)

*To all whom it may concern:*

Be it known that I, EDWARD L. WILLIAMS, of Chicago, Illinois, have invented certain new and useful Improvements in Bicycle-Lamps, of which the following is a specification.

This invention relates to certain improvements in bicycle-lamps, and more particularly, first, to means whereby a supply of air is furnished to support combustion, and in such manner as to prevent extinguishing the flame under all conditions of use, and, second, to improved means for securing the lamp to a bicycle or other vehicle.

In carrying out my invention I provide a lamp body which furnishes a flame-chamber, the wick-tube entering the lower part of the flame-chamber axially. Below the flame-chamber I provide an air-chamber open on all sides to the atmosphere and separated from the flame-chamber by a wind-guard in the form of a horizontal plate or diaphragm closed in front of the wick-tube, and having an opening, port, or passage in the rear of said tube to admit air into the flame-chamber behind the wick-tube. I also provide adjustable plates, by means of which the area of the opening or port may be varied.

My improved means for securing the lamp to the bicycle consists of a clamp having a universal joint, as hereinafter described.

Figure 4:
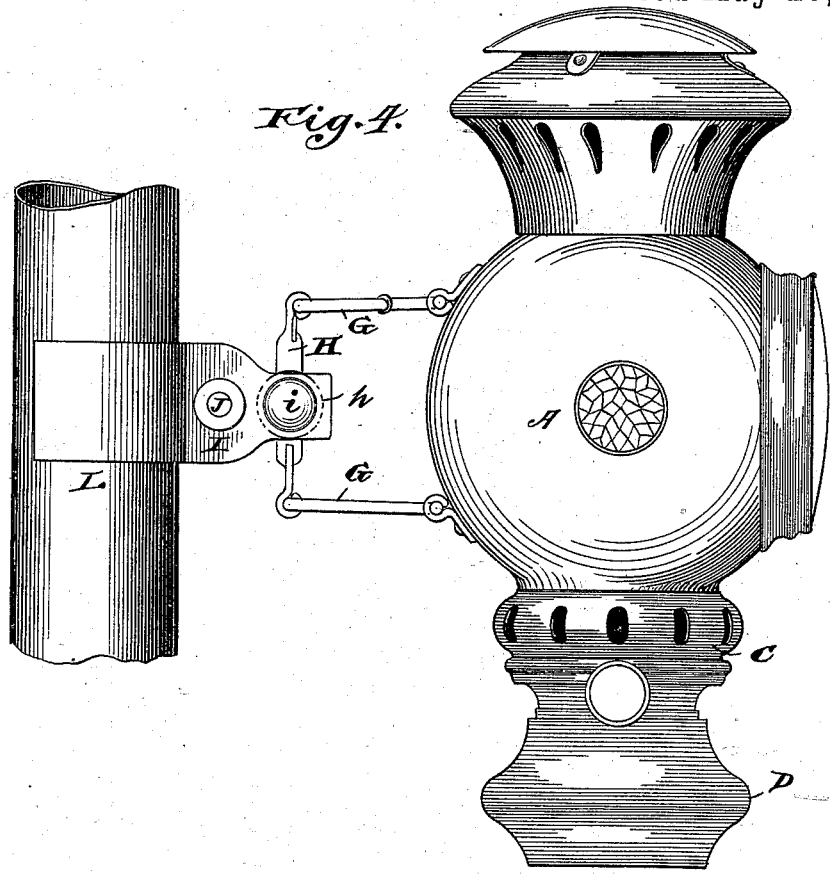
Figure 5:
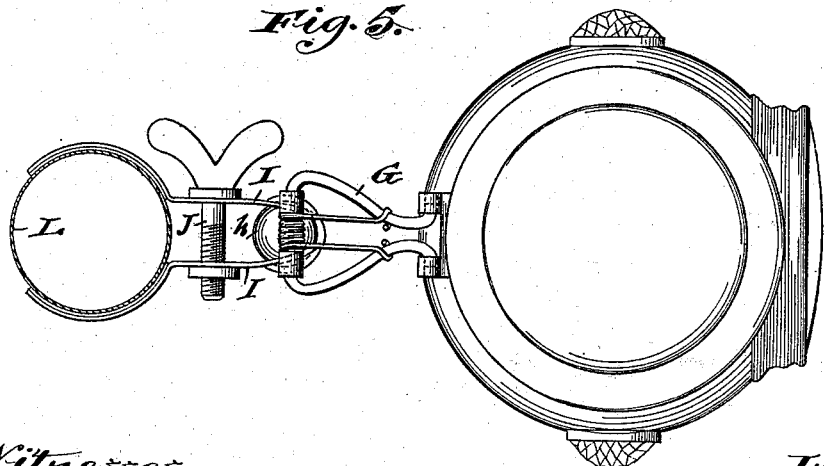

In the accompanying drawings, Figure 1 is a side elevation, partly in section, through the body of the lamp. Fig. 2 is a sectional plan view of the lamp and one member of the front fork, showing the clamp in plan. Fig. 3 is a plan view showing a portion of the lamp-body and the guard. Figs. 4 and 5 are respectively a side elevation and a plan of the lamp with the means for securing it to the steering-head post.

The lamp which is shown in the drawings is constructed as to its form and materials in substantial accordance with the description contained in my application, Serial No. 553,877, filed June 24, 1895; but I have improved the said lamp by the addition thereto of means for supplying regulable quantities of air.

In the drawings, A represents the flame-chamber, and B the burner-tube, which is arranged axially of and projects up into said flame-chamber.

C is a perforated ring providing an air-chamber and connecting the oil-reservoir D to the body of the lamp, and the perforations of which serve to admit air from all sides below the base of the flame-chamber. The air passing through said openings is admitted around the lower end or base of the wick-tube; but in order to prevent the flame from being blown out the space in front of the wick-tube is closed by a diaphragm E, formed by a plate of metal having marginal flanges e, which are sprung into the opening of the lamp-body. Said diaphragm has an irregular oval-shaped aperture extending on the front side in line with a plane parallel to the front side of the wick-tube and laterally and rearwardly from the wick-tube, so that the air to support combustion passes into the flame-chamber at the sides and in the rear of the wick-tube. The purpose of this form and location of the opening is to prevent the flame from being extinguished by an excess of air rushing in on the front side of the wick-tube, as would be likely to occur in a strong head-wind or when the rider is going fast. When the opening is arranged relatively to the wick-tube, as shown, the air will pass in through the opening and, striking the curved rear walls of the flame-chamber, will thence be deflected and pass over the flame and around it on all sides, thus furnishing plenty of oxygen to support combustion, but preventing the flame from being extinguished. The shape of the body is also important in the accomplishment of this result. The flame-chamber being curved, there are no plane surfaces or sharp angles to deflect the current of air directly across the flame, and, furthermore, such currents do not interfere with the escape of the vitiated air axially from the chamber. The openings on all sides of the air-chamber permit any excess of air to pass through the chamber. As an additional safeguard and auxiliary to the accomplishment of this end I provide adjustable wings or plates F F', substantially semicircular in form and pivoted to the diaphragm E at $ff'$ in front of the wick-tube. Said plates have slots in their proximate sides to embrace the wick-tube, and they can be closed around said tube, as seen in the full lines, Fig. 2, of the drawings, or they can be opened, so as to leave the aperture partially uncovered, as seen by the dotted lines of said figure, or adjusted to any desired position to suit different conditions of use and to secure the best results from the use of the lamp. Sometimes when the rider is proceeding against a strong head-wind sufficient air to support combustion will be drawn in around the edges of said plates though they be entirely closed, while in other cases they will be opened to their widest extent, so as to leave the aperture entirely uncovered. They can be adjusted very quickly and will remain in any position in which they are placed, as they swing in a horizontal plane and lie flat on the upper face of the diaphragm, the friction between the plates and the diaphragm being sufficient to maintain them in any adjusted position. The provision of the diaphragm alone with the air-inlet opening arranged relatively to the wick-tube, as described, is in itself desirable, and therefore I do not limit my invention to the use of the adjustable wings or plates in all cases, but by combining them with the diaphragm means are provided whereby the lamp can be adapted to all conditions of use.

The second part of my invention relates to the means for securing the lamp to a bicycle. To these ends I have provided a simple form of clamp and have slightly modified the construction of the usual parallel-arm bracket. As shown in the drawings, I may use the parallel arms G G, pivotally connected to the body of the lamp and having their outer ends pivotally connected by a link H. Said parts may be of the usual construction, except that the link H is provided at about its middle with a ball or globular enlargement $h$. The clamp may be formed of a single piece of sheet metal doubled upon itself and having at the bend circular seats corresponding in interior configuration to the external form of the ball. The arms of the bracket are marked I and the seats $i$. The arms are provided with some means for drawing them together, so as to prevent accidental turning of the clamp upon the ball. I have shown a simple screw J, having a winged head. The extremities of the arms I will be shaped so as to clamp some part of the bicycle. In Figs. 1 and 2 I have shown a clamp adapted to one of the members K of the front fork, while in Figs. 4 and 5 I have shown such extremities adapted to clamp the steering-head post L, and the clamp may be readily adapted for engagement to other parts of the bicycle if so desired. The screw J serves not only to secure the clamp against accidental turning upon the ball of the bracket, but also secures the clamp itself to the bicycle, and when the rider provides himself with two of these simple clamps the lamp may be attached to the front fork or to the steering-head, as circumstances may require. The universal joint between the clamp and the lamp-bracket makes it possible to place the lamp at any desired angle, so as to perfectly control the direction of the rays of light, and adapts the lamp also to be connected to the various makes of bicycles and to be carried always, as is desirable, in a perpendicular position.

Among the advantages of this clamp are the following: The clamp is made of a single piece of metal. It is adjustably connected to the bracket by the universal joint, and it can be removed with the lamp from the bicycle at a single operation, whereas in the common forms of lamp-brackets one part remains fixed to the bicycle-frame or must be removed by an operation separate from that of detaching the lamp.

It is obvious that my improved wind-guard may be applied to bicycle-lamps of other forms, but the lamp of the general form herein described will be found to give the best results with such wind-guard.

Without limiting my invention to precise details of construction and arrangement of parts, I claim—

1. In a bicycle-lamp having a flame-chamber, an air-chamber below the flame-chamber and open on all sides to the atmosphere and a wind-guard in the form of a diaphragm interposed between said chambers, closed in front of the wick-tube and having an opening or air-port in the rear of said tube, substantially as described.

2. In a bicycle-lamp having a flame-chamber with curved walls, a wick-tube projecting upwardly into said flame-chamber axially thereof, a ventilating-ring attached at the base of the flame-chamber, open on all sides to the atmosphere and serving to support the oil-reservoir and forming an air-chamber below the flame-chamber and a wind-guard in the form of a diaphragm interposed between the air-chamber and the flame-chamber, said diaphragm being imperforate in front of the wick-tube and having an opening in the rear of said tube to admit air to the flame-chamber, substantially as described.

3. In a bicycle-lamp having air-inlet openings at the base of the flame-chamber and adapted to admit air from all sides into the base of said chamber and a flame-chamber with curved walls, a wick-tube arranged axially of said chamber and projecting upwardly therein and a wind-guard consisting of a diaphragm arranged at the base of the flame-chamber and above the air-inlet openings, imperforate in front of the wick-tube and having an opening extending at the sides and in the rear of said wick-tube, substantially as described.

4. A bicycle-lamp having air-inlet openings below the flame-chamber adapted to admit air from all sides to the base of said chamber and a wind-guard located toward the base of the flame-chamber above the air-inlet openings and consisting of a metal plate or diaphragm adapted to close the opening in front of the wick-tube and having an aperture in the rear thereof and adjustable wings or plates adapted to be moved to cover or uncover said opening, substantially as described.

EDWARD L. WILLIAMS.

Witnesses:
 C. C. LINTHICUM,
 L. F. MCCREA.